US012651200B2

(12) United States Patent
Mallya Kasaragod et al.

(10) Patent No.: US 12,651,200 B2
(45) Date of Patent: Jun. 9, 2026

(54) SELF-CONTAINED ARTIFICIAL INTELLIGENCE (AI) EXECTUABLE TO AUTOMATE MODEL HOSTING, DEPLOYMENT, AND AI LIFE CYCLE

(71) Applicant: Flip Technology Corporation, San Francisco, CA (US)

(72) Inventors: Sunil Mallya Kasaragod, San Francisco, CA (US); Ravindra Manjunatha, Seattle, WA (US)

(73) Assignee: Flip Technology Corporation, San Francisco, CA (US)

( * ) Notice: Subject to any disclaimer, the term of this patent is extended or adjusted under 35 U.S.C. 154(b) by 639 days.

(21) Appl. No.: 18/306,915

(22) Filed: Apr. 25, 2023

(65) Prior Publication Data

US 2023/0368074 A1 Nov. 16, 2023

Related U.S. Application Data

(60) Provisional application No. 63/340,728, filed on May 11, 2022.

(51) Int. Cl.
*G06N 20/00* (2019.01)
(52) U.S. Cl.
CPC ................................... *G06N 20/00* (2019.01)
(58) Field of Classification Search
None
See application file for complete search history.

(56) References Cited

U.S. PATENT DOCUMENTS

| | | | |
|---|---|---|---|
| 12,218,801 B2 * | 2/2025 | Kim | G06V 20/58 |
| 2020/0005135 A1 * | 1/2020 | Che | G06N 3/0464 |
| 2020/0053155 A1 * | 2/2020 | Shi | H04L 41/16 |
| 2023/0074474 A1 * | 3/2023 | Imai | G06N 3/09 |

OTHER PUBLICATIONS

P. Kourouklidis, D. Kolovos, J. Noppen and N. Matragkas, "A Model-Driven Engineering Approach for Monitoring Machine Learning Models," 2021 ACM/IEEE International Conference on Model Driven Engineering Languages and Systems Companion (MODELS-C), Fukuoka, Japan, 2021, pp. 160-164. (Year: 2021).*

* cited by examiner

*Primary Examiner* — Mehmet Yesildag
(74) *Attorney, Agent, or Firm* — Fenwick & West LLP

(57) ABSTRACT

An artificial intelligence (AI) system generates a self-contained AI container packaged as an executable that can be installed on client devices or computing infrastructure. The AI container envelopes a set of components capable of performing one or more processes related to machine learning operations, including data collection, data processing, feature engineering, data labelling, model design, model training and performance optimization for underlying hardware, model deployment, and model feedback monitoring, and the like in a local environment of a client device or cloud environment of a computing infrastructure. The AI system packages the self-contained AI container as an executable that can be installed on client devices of any hardware configuration or operating system.

12 Claims, 6 Drawing Sheets

100

100

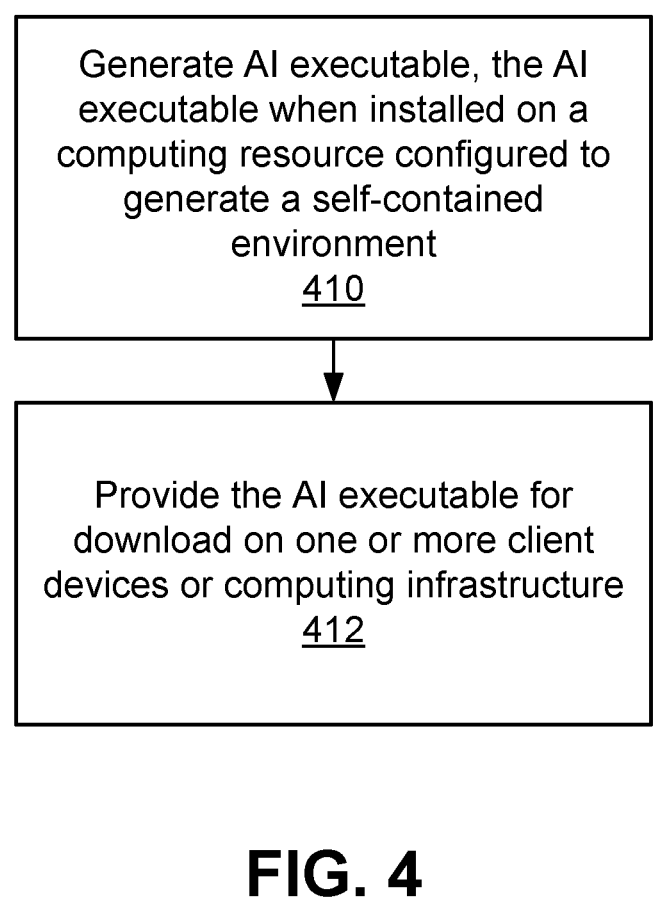

Generate AI executable, the AI executable when installed on a computing resource configured to generate a self-contained environment
410

Provide the AI executable for download on one or more client devices or computing infrastructure
412

FIG. 4

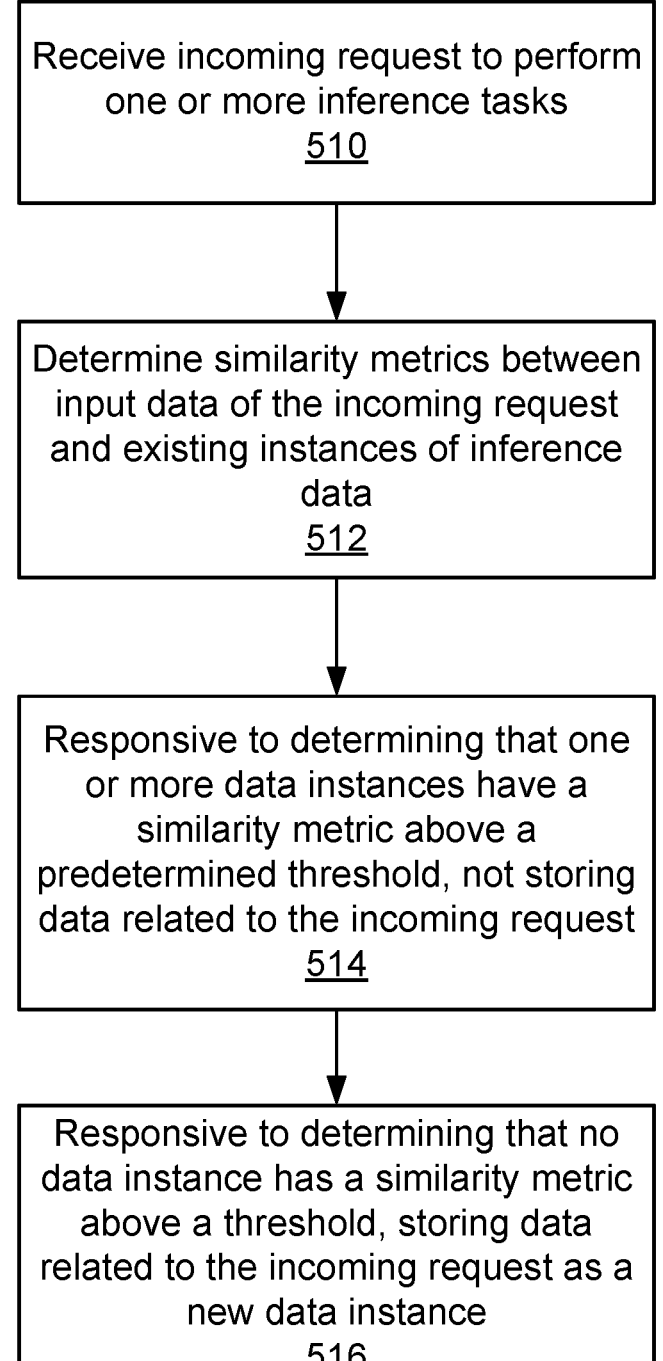

Receive incoming request to perform one or more inference tasks
510

Determine similarity metrics between input data of the incoming request and existing instances of inference data
512

Responsive to determining that one or more data instances have a similarity metric above a predetermined threshold, not storing data related to the incoming request
514

Responsive to determining that no data instance has a similarity metric above a threshold, storing data related to the incoming request as a new data instance
516

FIG. 5

SELF-CONTAINED ARTIFICIAL INTELLIGENCE (AI) EXECTUABLE TO AUTOMATE MODEL HOSTING, DEPLOYMENT, AND AI LIFE CYCLE

CROSS-REFERENCE TO RELATED APPLICATIONS

This application claims the benefit of U.S. Provisional Application No. 63/340,728, filed on May 11, 2022, which is incorporated herein in its entirety.

TECHNICAL FIELD

This disclosure relates generally to artificial intelligence (AI) and machine-learning (ML) applications, and particularly to self-contained AI executables.

BACKGROUND

AI and ML applications are used for a variety of tasks and applications, for example, natural language processing (NLP), image processing, video processing, or audio processing applications. As an example, in the NLP context, an inference system may apply a ML model, such as a deep learning neural network model, to a sequence of words that represent a query and generate a sequence of output words that represent a response to the query. As another example, the inference system may apply a ML model to an input document containing text and generate output that summarizes the text of the input document. As another example, the inference system may apply a ML model to a sequence of words that represent a sentence in French and generate a sequence of output words that represent a translation of the sentence in English.

Typically, AI applications use one or more ML models to perform inference tasks and the models are trained based on curated data that affect the performance and accuracy of the models. However, performance of the models can decrease over time as data distributions change. For example, data and the meaning of the data can change over time, and it may be unlikely that a model trained on a dataset will perform with high accuracy across many domains. Moreover, even if a model has high accuracy for a particular domain, the performance of the model may deteriorate over time as, for example, concepts and their interpretations change over time. For example, for NLP models, existing vocabulary may get new meanings ("concept drift") or new data may come into the vocabulary ("data drift").

To address these issues, machine learning operations ("MLOps") involve a set of processes that are performed to deploy and maintain the ML models such that the models and the data used to train the models are current. For example, the models may have to be re-trained on a regular basis with new training data to maintain or improve its accuracy. However, machine learning operations often require interconnection between many processes that require a high level of collaboration across data scientists, development engineers, and system engineers. In addition, because of the large amount of computation power that machine learning operations may consume, each process is typically deployed on clusters of processors on the cloud including generic processors or specialized AI processors such as graphics processing units (GPUs).

SUMMARY

An artificial intelligence (AI) system generates a self-contained AI container packaged as an executable that can be installed on client devices or computing infrastructure. The AI container envelopes a set of components capable of performing one or more processes related to machine learning operations, including data collection, data processing, feature engineering, data labelling, model design, model training and performance optimization for underlying hardware, model deployment, and model feedback monitoring, and the like in a local environment of a client device. The AI system packages the self-contained AI container as an executable that can be installed on client devices of any hardware configuration or operating system.

Specifically, a user of a client device or an entity of a computing infrastructure may download the self-contained AI container executable from, for example, a server of the AI system. The user of the client device may install the executable in a local environment of the client device. The installed AI container is a self-contained environment within the client device and includes a set of components that execute various functionalities related to machine learning operations. In particular, the set of components of the AI container can be integrated with various user applications on the client device or a computer infrastructure to perform one or more inference tasks in conjunction with the user applications. The set of components of the AI container also allow seamless automation of machine learning operations for models that are used to serve inference requests, such that the models can be automatically monitored and improved over time and can also be customized to the user based on user feedback.

BRIEF DESCRIPTION OF DRAWINGS

FIG. 4 is an example flowchart for generating self-contained AI executables according to one embodiment.

FIG. 5 is an example flowchart for a data similarity engine according to one embodiment.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Disclosed is a configuration (including a system, a process, as well as a non-transitory computer readable storage medium storing program code) for generating an AI container executable and deploying the AI container executable on a client device to generate a self-contained environment.

Overview

Figure 1:
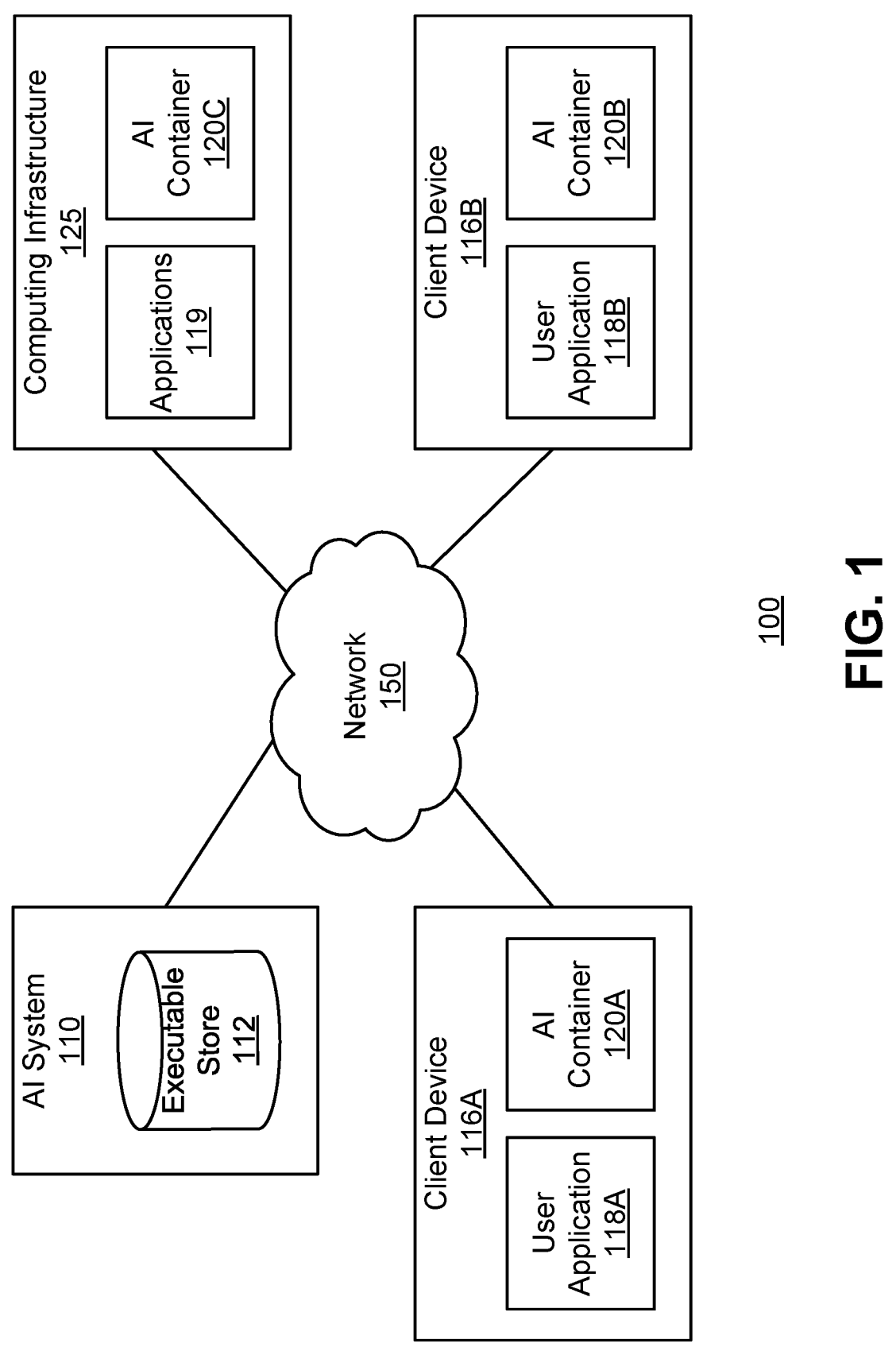
FIG. 1 is a system environment for generating and providing self-contained artificial intelligence (AI) container executables by an AI system according to one embodiment.

FIG. 1 is a system environment 100 for generating and providing self-contained artificial intelligence (AI) container executables by an AI system 110 according to one embodiment. The system environment 100 shown in FIG. 1 comprises one or more client devices 116A and 116B, a computing infrastructure 125, a network 150, and an AI system 110. In alternative configurations, different and/or additional components may be included in the system environment 100 and embodiments are not limited hereto.

The AI system may generate one or more self-contained AI containers that each envelope a set of components capable of performing one or more processes related to machine learning operations. In one embodiment, the AI system 110 packages the components of an AI container as a single executable that can be installed on client devices 116. The AI system 110 may store the executables in the executable store 112 and provide the executables to client devices 116 for download. When installed on a client device 116, the set of components of an AI container are configured to integrate with user applications 118 on the client device 116 and perform one or more AI or machine learning (ML) inference tasks related to user applications. Thus, depending on the types of inference tasks, the executable store 112 may store the executables for various AI containers that each include one or more ML models used to perform one or more inference tasks.

In general, AI and ML applications are used for a variety of inference tasks, for example, natural language processing (NLP), image processing, video processing, or audio processing applications. As an example of the NLP context, an inference system may apply a machine-learned (ML) model, such as a deep learning neural network model, to a sequence of words that represent a query and generate a sequence of output words that represent a response to the query. As another example, the inference system may apply a ML model to an input document containing text and generate output that summarizes the text of the input document. As another example, the inference system may apply a ML model to a sequence of words that represent a sentence in French and generate a sequence of output words that represent a translation in English.

Typically, AI applications may use one or more ML models to perform inference tasks and the models are trained based on curated data that affect the performance and accuracy of the models. However, performance of models trained for a particular task can decrease over time as data distributions change. For example, data and the meaning of the data can change over time, and it may be unlikely that a model trained on a dataset will perform with high accuracy across many domains. Moreover, even if a model has high accuracy for a particular domain, the performance of the model may deteriorate over time as, for example, concepts and their interpretations change over time. For example, for NLP models, existing vocabulary may get new meanings ("concept drift") or new data may come into the vocabulary ("data drift").

To address these issues, machine learning operations ("MLOps") involve a set of processes for deploying and updating the ML models such that the models and the data used to train the models remain current and any improvements to the models are incorporated over time. For example, the models may have to be retrained on a regular basis with new training data to maintain or improve its accuracy. However, machine learning operations often require interconnection between many processes that require a high level of collaboration across data scientists, development engineers, and system engineers.

Moreover, because of the large amount of computation power that machine learning operations may consume, systems for machine learning operations are typically deployed on clusters of processors on the cloud, where each process in the workflow may have a dedicated module. Managing the machine learning life cycle may require multiple users or entities to coordinate with each other across multiple modules which can significantly complicate the process. In addition, it may be difficult for ML models to learn custom behaviors or preferences for an individual user or entity, as the models are deployed on cloud computing systems that are shared and receive data across many users or entities at the same time.

Thus, in one embodiment, the AI system 110 packages self-contained AI containers as executables that can be installed on client devices 116 of any hardware configuration or operating system. In another embodiment, the AI containers packaged by the AI system 110 can also be installed on computing infrastructures 125 including public cloud environments or private cloud environments (on-premise infrastructure). The client devices 116 and computing infrastructures 125 may collectively be referred to as computing resources.

In addition to one or more models, the AI container further includes components for automatically performing machine learning operations within the local environment of the client devices 116 or the computing infrastructure 125. The machine learning operations may include data collection, data processing, feature engineering, data labelling, model design, model training and optimization, model deployment, and model feedback monitoring, and the like that are parts of a continuous machine learning life cycle for maintaining and updating the ML models and the data used to train the ML models. By packaging these components as a self-contained AI container executable, the AI system 110 allows a user of a client device 116 or the computing infrastructure 125 to simply integrate AI functionalities to user applications 118 on a client device 116 or applications deployed within the computing infrastructure 125 without having to configure individual parts of the workflow themselves.

The AI system 110 may generate a plurality of AI container executables depending on the inference tasks to be performed and depending on different hardware and operating system configurations of the client devices 116 or the computing infrastructure 125. In one instance, the AI executable is configured as a .exe or .msi for Windows®, .dmg for Mac®, .apk on Android®, or .ipa on .iPhone®, and includes a set of instructions that when run on a client device 116 or computing infrastructure 125 generates the respective self-contained environment including a set of components for integration with one or more user applications 118 on the client device 116 or applications deployed within the computing infrastructure 125. For example, the executable store 112 may include an AI executable that includes a set of components dedicated to performing NLP inference tasks and related machine learning operations thereof, another AI executable that includes a set of components dedicated to performing image processing tasks and related machine learning operations thereof, and the like.

While a particular client device 116 may have resource constraints compared to, for example, servers on the cloud, the AI system 110 configures the set of components of the AI container 120 to include functionalities that enable the entire life cycle of machine learning operations to be performed locally on the client device 116 within a self-contained environment. Moreover, the AI system 110 may also configures the set of components of the AI container 120 to enable lifecycle of machine learning operations to be performed on the computing infrastructure 125. In one embodiment, the AI system 110 further configures the set of components to automatically receive user feedback information from the client device 116 and the computing infrastructure 125 on inference tasks performed by the one or more models of the AI container. The feedback information can be used to improve the models and customize the models specific to the user.

The client device 116 is a computing device capable of receiving user input as well as communicating via the network 150. While two example client devices 116A and 116B are illustrated in FIG. 1, in practice many client devices 116 may communicate with the systems in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 150.

In one embodiment, a client device 116 includes one or more user applications 118. A user application 118 may be any type of desktop or mobile application, such as a web browser, a PDF reader, text processing applications, image processing applications, audio processing applications, and the like. For example, a user application 118A of client device 116A may include a word processing application that a user of the client device 116A uses to create and edit documents. An example user application 118B of client device 116B may include an image processing application that a user of the client device 116B can use to edit or enhance images and videos.

In one embodiment, different from large-scale cloud computing systems that are composed of software, hardware, infrastructure, and services that are shared among many users and organizations, a client device 116 that is provided with an AI container executable from the AI system 110 may be a dedicated device for one or more users (e.g., personal laptop, personal desktop, mobile devices) and may be fairly limited with respect to resources such as memory, computation power, speed, compared to resources on the cloud. A user of a client device 116 can download and install one or more AI container executables that are stored in the executable store 112 of the AI system 110. The AI container 120 is a self-contained environment and the set of components of the AI container 120 integrate with user applications 118 on the client device 116 to incorporate AI and ML functionalities in conjunction with the user applications 118. However, embodiments are not limited hereto, and it is appreciated that a client device 116 can be any form of computing architecture that runs one or more user applications 118 that can be integrated with an AI container 120 generated from an executable of the AI system 110.

Specifically, an AI container 120 can be integrated with one or more user applications 118 and include at least one or more models used to perform a set of inference tasks. The AI container 120 receives requests from the user application 118 to perform one or more inference tasks and generate predictions using the one or more models and use the predictions to generate a response to the request. Thus, a user of a client device 116 may select and request an appropriate AI container executable from the executable store 112 that is compatible with the desired inference task, the user application 118 that the AI container 120 will be integrated with, or other hardware and operating system configurations of the client device 116.

For example, in the environment 100 of FIG. 1, client device 116A may install an AI container 120A that is compatible with the word processing application 118A (e.g., Microsoft Word), and among other types of inference tasks, the AI container 120A may include one or more models for summarizing the document being edited by a user. As another example, the client device 116B may install an AI container 120B that is compatible with the image processing application 118B (e.g., ADOBE PHOTOSHOP), and among other types of inference tasks, the AI container 120B may include one or more models for performing recognition of objects of interest in an image or video.

Specifically, the AI container 120 may receive a request from a user application 118 and generate input data for the request. For example, for a summarization task, the input data may be encodings of the input text to be summarized. Depending on the requested inference task, the AI container 120 may select an appropriate model and apply the selected model to the input data to generate one or more predictions for the requested task. For the summarization task, the predictions may be encodings of the resulting summarized text. The AI container 120 returns a response (e.g., summarized text) to the user application 118 based on the generated predictions.

The computing infrastructure 125 is a computing resource such as a public cloud environment (e.g., AMAZON Web Service, GOOGLE Cloud Platform, MICROSOFT AZURE) or a private cloud environment such as on-premise infrastructure. While one example computing infrastructure 125 is illustrated in FIG. 1, in practice many computing infrastructure instances 125 may communicate with the systems in environment 100.

In one embodiment, the computing infrastructure 125 is a public cloud environment or platform that provides on-demand computing resources, such as servers, storage, databases, applications, networking, load balancing, analytics, and the like that can be accessed via the network 150. The public cloud platform may be managed by third-party cloud providers and made available to many users. Public cloud platforms offer high availability and allow organizational entities to quickly and easily provision resources. In one instance, the public cloud platform may be configured as a multi-tenant architecture in which data is stored and services are deployed for multiple tenants of the cloud platform. The datastore may store data for different tenants in separate physical or logical structures. In another instance, the cloud platform may be configured as a single-tenant architecture in which data is separately stored and services are separately deployed per single tenant of the cloud platform.

In another embodiment, the computing infrastructure 125 is a private cloud environment or on-premise infrastructure that provides computing resources that are dedicated to one organization. Specifically, on-premise infrastructures may provide the elastic, virtualized services like public cloud platforms but also offers greater control and visibility into the infrastructure by the organization. The on-premise infrastructure may reside within an organization's data center.

In one embodiment, the computing infrastructure 125 also includes one or more applications 119. An application 119 may be any type of application, such as the example applications described in conjunction with user applications 118, or any application deployed on the computing infrastructure 125, such as load balancing applications, web applications, and the like. Different from the user applications 118 installed on a client device 116, the applications 119 of the computing infrastructure 125 may reach a significant number (e.g., thousands, tens of thousands, millions) of users, and multiple instances of an application 119 may be deployed on the computing infrastructure 125 to service users of the application 119.

In one embodiment, an entity deploying applications on the computing infrastructure 125 can install one or more AI container executables 120 that are stored in the executable store 112 of the AI system 110. The set of components of the AI container 120 integrate with applications 119 on the computing infrastructure 125 to incorporate AI and ML functionalities in conjunction with the applications 119. For example, when the computing infrastructure 125 is a public cloud environment with a multi-tenant architecture, an AI container 120 may be installed per tenant that is dedicated to the applications 119 deployed and managed by the tenant. However, embodiments are not limited hereto, and it is appreciated that the computing infrastructure 125 can be any form of computing architecture that runs one or more applications 119 that can be integrated with an AI container 120 generated from an executable of the AI system 110.

The AI container 120 receives requests from the application 119 to perform one or more inference tasks and generate predictions using the one or more models and use the predictions to generate a response to the request. Thus, an entity managing the application 119 deployed on the computing infrastructure 125 may select and request an appropriate AI container executable 120 from the executable store 112 that is compatible with the desired inference task, the application 119 that the AI container 120 will be integrated with, or other hardware and operating system configurations of the computing infrastructure 125.

For example, in the environment 100 of FIG. 1, an entity (e.g., a tenant) of a computing infrastructure 125 may install an AI container 120C that is compatible with the load balancing application 119, and among other types of inference tasks, the AI container 120C may include one or more models for monitoring and generating predictions as loads are processed by the application. As another example, another tenant may install an AI container 120C that is compatible with an image generation application 119, and among other types of inference tasks, the AI container 120C may include one or more models for generating images based on input text. Different from AI containers 120A, 120B installed in local client devices 116, the AI container 120C may receive requests associated with multiple users that the applications 119 serve on the computing infrastructure 125.

In one embodiment, the AI container 120 also stores inference data that at least includes activity records related to previous instances of requests received by the AI container 120. In one instance, the inference data includes the input data for the request, predictions and responses generated for the request, and/or feedback information obtained from user interaction with the user application 118 responsive to providing the response to the request. As described in further detail below, the inference data may be updated as the AI container 120 continuously serves requests and receives feedback information from the user over time. The inference data can be used to improve the models of the AI container 120 and further customize the models to reflect preferences of the user of the client device 116 or users of the applications 119 of the computing infrastructure 125.

Figure 2:
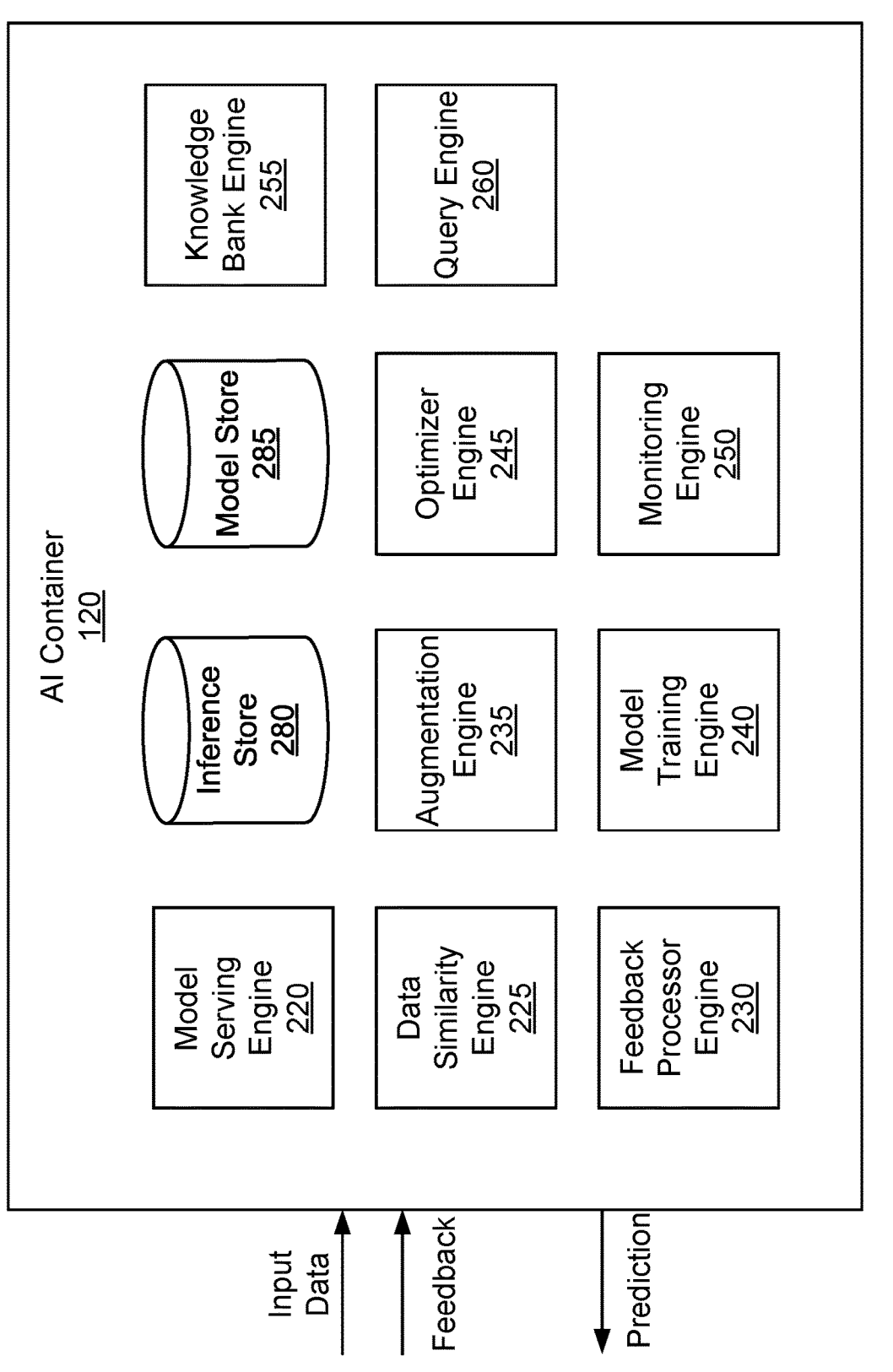
FIG. 2 is a block diagram illustrating components of the AI system according to one embodiment.

In one embodiment, as described in more detail in conjunction with FIG. 2, responsive to receiving a current request, the AI container 120 further determines a similarity metric between the input data of the request and existing instances in the inference data that determine whether the current request, the predictions generated for the current request, and feedback information obtained for the current request should be stored as new instances in the inference data. Responsive to generating a response to the request, the AI container 120 receives feedback information obtained from user interaction on the client device 116 or the computing infrastructure 125. The feedback information may be stored in the inference data and used to further customize the models based on learned user preferences. In one embodiment, the AI container 120 periodically retrains the one or more models or trains a new model based on data included in the inference data. In one embodiment, the AI container 120 also optimizes the training process of the models taking into consideration available resources (e.g., processor capacity) on the client device 116 or the computing infrastructure 125 and the type of inference task for optimization.

The functionalities of the AI container 120 are continuously performed over time, such that the machine learning workflow is automated within the self-contained environment on the client device 116 or the computing infrastructure 125. This allows a user of the client device 116 to integrate the AI container 120 with user applications 118 without having to significantly manage parts of the machine learning life cycle since the components of the AI container 120 automatically perform the required operations for the user. Similarly, this allows entities managing applications 119 on a computing infrastructure 125 to integrate the AI container 120 with applications 119 without having to significantly manage parts of the ML life cycle in separate modules of a cloud platform. Moreover, as inference requests are processed, components of the AI container 120 are updated with data generated from the client device 116 or the computing infrastructure 125, and the AI container 120 can be further trained and customized to reflect preferences of the particular user.

The embodiments described herein for generating and providing AI container executables are not limited to the environment shown in FIG. 1. While FIG. 1 illustrates that the executable store 112 is hosted on an AI system 110, in other embodiments, the executable store 112 can be hosted on any type of digital distribution platform for computer software, where an AI system 110 can distribute the container executables to client devices 116 or computing infrastructures 125 through the platform. For example, the executable store 112 may be hosted on a cloud store, a website, or an application store for mobile and smartphone devices.

The client devices 116 and the AI system 110 are configured to communicate via the network 150, which may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

Artificial Intelligence (AI) Container

FIG. 2 is a block diagram illustrating components of the AI container 120 according to one embodiment. The AI container 120 shown in FIG. 2 includes a model serving engine 220, a data similarity engine 225, a feedback processor engine 230, an augmentation engine 235, a model training engine 240, an optimizer engine 245, and a monitoring engine 250. The AI container 120 also includes an inference datastore 280 and a model datastore 285. In other embodiments, the AI container 120 may include additional, fewer, or different components for various applications. Conventional components such as network interfaces, security functions, load balancers, failover servers, management and network operations consoles, and the like are not shown so as to not obscure the details of the system architecture.

In one embodiment, an AI container 120 further includes an interface layer for configuring one or more application programming interfaces (APIs) that allow applications on a client device 116 to interact with the AI container 120. The interface layer may be encrypted using transport layer security (TLS) or similar variants. In one instance, the AI container 120 exposes a first API-consume that receives inference requests to perform one or more inference tasks using the models of the AI container 120. The AI container 120 also exposes a second API-feedback that receives feedback information from integrated applications on the client device 116 or applications deployed on computing infrastructure 125.

The inference datastore 280 stores inference data that at least includes activity records related to previous instances of requests received by the AI container 120. In one embodiment, the inference datastore 280 is a structured database in which each data instance includes the type of inference task requested, the input data for a respective request, predictions generated for the request, feedback information obtained from user interaction with the user application 118 responsive to responding to the request, and/or desired outcome of the user as determined by feedback information. In one instance, components of the AI container 120 may additionally obtain a set of features from the input data and the inference datastore 280 may further include the set of features for the request.

The inference datastore 280 is continuously updated as requests are serviced by the AI container 120. The data in the inference datastore 280 can be used to retrain models in the model datastore 285 or update the models based on feedback information to reflect particular user preferences. In one embodiment, the inference datastore 280 may include data generated from the client device 116 or the computing infrastructure 125. In other words, data generated from applications running on the client device 116 or interactions of the user with applications on the client device 116 that are feedback information. In another embodiment, the inference datastore 280 also may include data generated from other client devices 116 that are different from the client device 116 a particular AI container 120 is installed on. For example, the inference datastore 280 may communicate with different client devices 116 through the network 150 and receive additional instances of data from the different client devices 116 that are activity records related to requests processed by an AI container 120 installed on the client devices 116. In another embodiment, the inference datastore 280 may communicate with the AI system 110, and the AI system 110 may provide additional instances of data to the client device 116.

The model datastore 285 includes one or more machine-learning models that are used to service requests. As defined herein, a ML model may include any model that is capable of learning and adapting by drawing inferences from patterns in data in a supervised or unsupervised manner. The ML models stored in the model store 285 may include various types of ML models, such as artificial neural networks (ANNs), recurrent neural networks (RNNs), deep learning neural networks (DNNs), bi-directional neural networks, transformers, classifiers such as support vector machines (SVMs), decision trees, regression models such as logistic regression, linear regression, stepwise regression, and the like.

Moreover, while a particular model stored in the model datastore 285 may serve one inference task (e.g., classification of spam), another model may serve multiple inference tasks. For example, a neural network model may include a shared layer including one or more layers of nodes and multiple branches stemming from the shared layer. Each branch may include one or more layers dedicated to generating predictions for a respective inference task. In one embodiment, when the AI container 120 is downloaded on a client device 116 or the computing infrastructure 125, the model datastore 285 may include models that were trained by the AI system 110 using training data generated from a wide range of sources. As the inference datastore 280 is updated over time, the ML models in the model datastore 285 may be periodically retrained and updated to reflect changes in data generated by the client device 116 or the computing infrastructure 125.

In one embodiment, the model datastore 285 includes machine-learned models configured to perform multi-model inference tasks, in which one or more modalities of data are processed by the model. For example, a multi-modal machine-learned model may be configured to receive text data in the form of tokens, and generate an image corresponding to the text data. The model may be trained by the AI system 110 using multi-modal training data including pairs of text and images corresponding to the text. As another example, a multi-modal machine-learned model may be configured to receive various data modalities such as images, text, audio as inputs and generate a classification prediction based on the inputs. The model may be trained by the AI system 110 using multi-modal training data including instances of image, text, and audio data and labels corresponding to classification labels.

The model serving engine 220 receives requests to perform one or more inference tasks from a user application 118 of a client device 116 or applications 119 deployed on the computing infrastructure 125. For example, a user can configure a text processing application to use components of the AI container 120. Responsive to a user opening a financial report and clicking on a "summarize" button in the text processing application, the text processing application provides a request to the AI container 120 using, for example, the first consume API. For be formatted as:

example, an example API call may Consume (TaskName=Summarize, Input=ReportText, NumberSummaries=2) that indicates the requested inference task is to summarize input text, the input text file is called ReportText, and the number of summaries requested is two summaries.

The model serving engine 220 obtains the input data for the request and may perform one or more data processing operations to encode the input data into a numerical format. For example, responsive to obtaining the input text to be summarized, the model serving engine 220 may encode individual words of the input text into a respective vector using one-hot encoding or embeddings. In one embodiment, the model serving engine 220 may also generate a set of features characterizing the input data. The features may be extracted by applying a separate machine-learning model to the input data or any other method. For example, responsive to obtaining the input text, the model serving engine 220 may extract features such as domain, style of writing, length of document, time of authorship, and the like that characterize various aspects of the document.

Depending on the requested inference task, the model serving engine 220 selects one or more models from the model datastore 285 that are configured to perform the desired inference task. The model serving engine 220 generates predictions by applying the selected models to the input data or features extracted from the input data. For example, the model serving engine 220 may select two models from the model datastore 285 that are each configured to perform summarization of text and generate predictions for the input text by applying each of the selected models to the encoded input text. The predictions output from the model may be a sequence of encodings that represent a summarized version of the input text. As another example, the model serving engine 220 may select a model from the model datastore 285 that is configured to receive a combination of image and text data and generate predictions by applying the selected model to the input data.

The model serving engine 220 may generate a response to the request from the predictions. The model serving engine 220 provides the response to the user application 118 such that the user application 118 can display the response to the user, or provides the response to the application 119 such that the application 119 can display the response to a user of the application 119. For example, the model serving engine 220 may convert the predictions to actual text and provide both the summarized texts to the word processing application. Responsive to receiving the response, the word processing application can display the summarized texts on a viewing pane to the user. In one instance, the model serving engine 220 stores the desired inference task, input data, and predictions generated for the request in the inference datastore 280 as a new data instance.

In one embodiment, before serving a request, the model serving engine 220 may alternatively route the incoming request to the data similarity engine 225. The data similarity engine 225 determines similarity metrics between the input data of the request and existing instances of data stored in the inference datastore 280. Based on the similarity metric, the data similarity engine 225 determines whether data related to the incoming request should be stored as new instances in the inference datastore 280. In one embodiment, a similarity metric between input data for the request and a data instance in the inference datastore 280 is determined by comparing the input data of the request to the input data recorded for the data instance. For example, the similarity metric may be inversely proportional to a Euclidean distance between the input data of the incoming request and the input data recorded for the data instance, and a Euclidean distance between extracted features for the incoming request and the extracted features recorded for the data instance. However, it is appreciated that any metric can be used as the similarity metric as long as it indicates some measure of similarity.

In one embodiment, responsive to receiving an incoming request, the data similarity engine 225 may compute similarity metrics between the input data of the incoming request and existing instances of data in the inference datastore 280. In one instance, responsive to determining that one or more data instances have a similarity metric above a predetermined threshold, the data similarity engine 225 determines not to store the data for the incoming request as a new instance in the inference datastore 280. In such an instance, the data similarity engine 225 may retrieve the recorded predictions for the identified data instances and provide the recorded predictions to the model serving engine 220. The model serving engine 220 may provide the response to the incoming request based on the recorded predictions for the identified data instances instead of using computational resources to apply a model for performing the inference task.

In another instance, responsive to determining that no data instances have a similarity metric above a predetermined threshold (i.e., input data for the incoming request is from data distribution that has not been seen by the AI container 120), the data similarity engine 225 determines to store the data for the incoming request as a new instance in the inference datastore 280 and may provide such an indication to the model serving engine 220. While machine learning operations performed on the cloud have a significant amount of storage and can store data related to all requests, machine learning operations running on a client device 116 may not have the memory capability to store large amounts of data. The data similarity engine 225 can be used to determine the best data samples to be stored in the inference datastore 280 and used later for training the ML models of the AI container 120.

Responsive to generating a response to the request, the feedback processor engine 230 receives feedback information obtained from user interaction on the client device 116 or user interactions received at the computing infrastructure 125. The feedback information may be stored in the inference datastore 280 and used to further customize the models based on learned user preferences. Specifically, user feedback can be received via the second feedback API and may include various forms of user behavior that provide information on how a user is responding to the predictions generated for the requested task.

In one instance, user feedback can be received as explicit feedback that may include a rating given by the user on the quality of the generated predictions (e.g., thumbs up or thumbs down, star rating), explicit choice (e.g., choice of summary among multiple summaries), and the like. In another instance, user feedback can be received as implicit feedback that include implicit browsing of an application, clicks in an application, saliency indicating time spent in each part of the application, tweaks or edits to the content or model predictions. In any case, the use feedback may come in various forms if the information is helpful to determine the user's response to the predictions. For example, user feedback for the text processing application may include which summary the user ended up inserting in an input document, whether the user modified the summarized text, whether the user accepted the summarized text for insertion, and the like.

Responsive to receiving feedback information, the feedback processor engine 230 may normalize the feedback information and store the feedback information for a request in association with the data instance for the request. The feedback processor engine 230 can use the feedback information to learn user preferences and further customize the ML models to reflect these preferences. A more detailed description of the feedback processor engine 230 is described in conjunction with FIG. 3.

The augmentation engine 235 generates synthetic data based on instances stored on the inference datastore 280 that can be used as augmented training data for training the ML models. In particular, the augmentation engine 235 uses data augmentation techniques to crate new training data by applying, for example, domain-specific techniques. For example, when the training data are instances of different images, data augmentation may involve creating transformed versions of images that belong to the same class as the original image. The augmentation engine 235 may monitor the inference datastore 280 and generate augmented data once a predetermined number of data instances are added. For example, the augmentation engine 235 may generate 500 augmented data samples based on 25 data samples added to the inference datastore 280.

In one embodiment, the augmentation engine 235 may communicate with the data similarity engine 225 to determine augmented data that are distinct or diverse compared to existing instances of data in the inference datastore 280. For example, the augmentation engine 235 may determine similarity metrics similar to that described in conjunction with the data similarity engine 225 for the augmented data, and store only those samples that have a similarity metric below a predetermined threshold.

The model training engine 240 trains one or more machine-learning models in the model datastore 285 based on the inference datastore 280. Specifically, while the AI container 120 may initially provide models that were previously trained by the AI system 110, the model training engine 240 may continuously monitor the inference datastore 280 as new instances of data are updated and retrain the ML models based on the updated data. This allows the ML models to be reflect recent changes in data generated from the client device 116 or the computing infrastructure 125. In one embodiment, the model training engine 240 may monitor the inference datastore 280, and responsive to determining that a threshold number or proportion of data instances are added for a particular inference task, trigger retraining of the ML models that serve the inference task. For example, the model training engine 240 may retrain ML models that are directed to serving classification of spam responsive to determining that 25 new data samples are added to the inference datastore 280 and 500 augmented samples are added to the inference datastore 280 by the augmentation engine 235.

In one embodiment, the model training engine 240 may train a model by repeatedly iterating between a forward pass step and a backpropagation step. During the forward pass step, the model training engine 240 generates a set of estimated predictions by applying the model with an estimated set of parameters to the training data. The model training engine 240 computes a loss function based on the desired or known labels of the training data and the set of estimated predictions. The desired or known labels may be inferred from the feedback information that was store in conjunction with the feedback information for a data instance. During the backpropagation step, the model training engine 240 computes one or more error terms from the loss function and backpropagates the error terms to update parameters of the model. This process is repeated for multiple iterations until a convergence criterion is reached.

The model training engine 240 may also perform one or more evaluation processes to determine whether a model has reached a satisfied level of prediction accuracy and is ready to serve requests. For example, the model training engine 240 may partition a set of data instances into multiple subsets including a training data subset, a validation data subset, and a test data subset. The model training engine 240 iteratively updates the parameters of the model using the training data. The model training engine 240 further configures the model using the validation data. The model training engine 240 evaluates the performance of the model using the test data. Responsive to the performance being above a predetermined threshold, the model training engine 240 may store the updated model in the model datastore 285 such that the model can be deployed to serve requests. The model training engine 240 may continuously and periodically monitor the inference datastore 280 and retrain models stored in the model datastore 285 such that the models are current.

In one embodiment, the model training engine 240 further communicates with the optimizer engine 245 during the training process to optimize training based on resources available on the client device 116 or the computing infrastructure 125. Specifically, the optimizer engine 245 takes into consideration available resources (e.g., processor capacity) on the client device 116 or the computing infrastructure 125 and the type of inference task to be trained for to optimize the training process. In one instance, the optimizer engine 245 monitors the computational resources of the client device 116 or the computing infrastructure 125 and determines constraints on resources with respect to, for example, hardware, available CPU cycles, and adjusts the training process according to these limitations. For example, the optimizer engine 245 may determine the optimal time to use resources on a client device 116 or the computing infrastructure 125 such that the training process does not significantly interfere with any user applications running on the client device 116.

In one embodiment, the model training engine 240 may have access to data instances that are directed to a particular inference task, and it may be advantageous to update only the subset of parameters of a multi-task neural network model that are dedicated to performing that inference task for computational efficiency. The optimizer engine 245 may receive such an indication from the model training engine 240 and configure only the layers and weights associated with those layers for update based on the new training data that are dedicated to performing the inference task. While cloud computing systems have the ability to update entire model layers and weights (e.g., 500,000 weights, 1,000,000 weights) when retraining an ML model, the optimizer engine 245 monitors available resources on the client device 116 and selects only the subset of weights that need to be updated to train, for example, only those portions of a machine-learning model (e.g., different branches of the multi-task neural network model) that need to be retrained given the resource-constrained environment of the client device 116.

In one embodiment, the optimizer engine 245 may also select one or more hyperparameters for training. Specifically, while the training process updates a set of internal parameters of a model (e.g., weights for layers of a neural network), the model may also be associated with a set of hyperparameters that are not internal parameters but otherwise define the structure and behavior of the ML model. For example, hyperparameters may be related to model architecture and may indicate the number of layers, reshaping of data, and the like of a neural network model. As another example, hyperparameters may be related to model complexity and indicate the number of model parameters available in each layer. As another example hyperparameters may be related to loss function and learning rate and indicate to what extent the parameters will change for each iteration of the training process or how long or how many iterations of the training process. As another example, hyperparameters may be related to regularization and indicate the degree of overfitting.

The values of hyperparameters affect the internal parameters of a model, and typically optimal values for hyperparameters are manually configured through, for example, evaluating the performance of the ML model on the validation set. For example, the model may be evaluated based on a range of hyperparameter values and the hyperparameter value with the best performance may be selected. This process may require significant computational resources since the set of hyperparameters have to be manually configured in addition to determining the set of internal parameters of the model. Thus, in one embodiment, the optimizer engine 245 selects one or more hyperparameters to be configured during training depending on the inference task and data instances available to the model training engine 240 and the type of client device 116 the AI container 120 is installed on. In this manner, the optimizer engine 245 can select, for example, only those hyperparameters that need to be configured to update a portion of the ML model for the desired inference task or only those hyperparameters that are necessary given the resource constraints on the client device 116.

The monitoring engine 250 monitors the performance of newly trained models.

Specifically, a model may have multiple versions based on times the model was retrained, different types of data instances used to train the model, and the like. For example, version 1 ("v1") of a multi-task neural network model may be initially trained by the AI system 110. Subsequently, version 2 of the multi-task neural network may be retrained by the model training engine 240 using updated data instances in the inference datastore 280 for a first inference task, and version 3 of the multi-task neural network may be retrained by the model training engine 240 using updated data instances for a second inference task at a different time. When v1 of the multi-task neural network is deployed on the client device 116, the monitoring engine 250 may also evaluate the performance of v2 and v3 of the model. Responsive to the performance of these versions being above a threshold, the monitoring engine 250 may place these models in the model datastore 285 such that the models can be deployed to service requests.

The knowledge bank engine 255 provides access to pre-packaged domain specific data stored locally in the form of raw text documents or embedding vectors. This domain specific data may serve two main purposes. First, it provides faster access to additional context for improved model accuracy and second, to enforce privacy and security as the data is held secure within the perimeters of the AI Container 120. Typically, documents such as internal documentation, company policies, customer analytics, and transactional data may be included in the knowledge bank engine 255. The knowledge bank engine 255 takes in as input a text (or image, video, other data modality) query from the query engine 260 and outputs a KnowledgeCollection which is a JSON collection of embeddings or text documents to be used as additional context by the model. For example, when running a summarization report generation task, additional context in the form of company policy document could be used to provide a pertinent summary that adheres to the acceptable policies and rules of the company.

The query engine 260 is responsible to add additional context or knowledge information to enrich the inputs that are sent into the AI container 120 such as Consume (TaskName=Summarize, Input=ReportText, NumberSummaries=2) to generate a higher quality output. The additional context could come from different sources including querying systems inside or outside of the AI container 120. The query engine 260 can generate queries in the native query language of the knowledge system to access data. For example, it can generate queries to access documents from the knowledge bank engine 255 or inference store 280 or sources that require intranet access such as internal company wikipedia or external sources that require internet access such as using a search engine. The query engine 260, after querying the data is responsible to parse, process and aggregate the data before sending it further downstream. The input into the query engine 260 is the task definition and it's parameters including input text (InputText) and the output from this system is context text (ContextText) that is synthesized by the query engine 260 and inference instruction for the model serving engine 220.

Feedback Processor Engine

Figure 3:
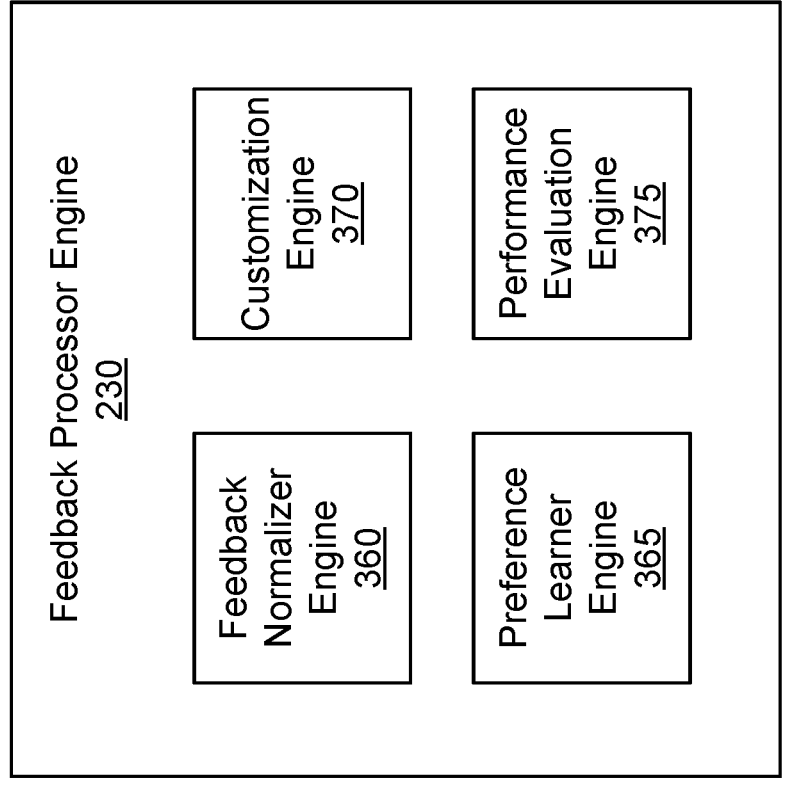
FIG. 3 is a block diagram illustrating components of the feedback processor engine according to one embodiment.

FIG. 3 is a block diagram illustrating components of the feedback processor engine 230 according to one embodiment. The feedback processor engine 230 includes a feedback normalizer engine 360, a preference learner engine 365, a customization engine 370, and a performance evaluation engine 375. In other embodiments, the feedback processor engine 230 may include additional, fewer, or different components for various applications. Conventional components such as network interfaces, security functions, load balancers, failover servers, management and network operations consoles, and the like are not shown so as to not obscure the details of the system architecture.

As described in conjunction with the AI container 120 of FIG. 2, the feedback processor engine 230 receives various user behaviors in response to providing responses to requests to perform one or more inference tasks. The feedback normalizer engine 360 normalizes different types of feedback that are included in the feedback information into a single format so the different types of feedback can be used to improve the ML models. In one instance, the feedback normalizer engine 360 converts feedback information in the format of (task name, input data, model predictions, desired output for user, human preference score). The human preference score indicates a difference between the predictions generated by the ML model and the desired output for the user.

For example, a normalized feedback instance for a user behavior of inserting and revising a first summarized text output by the AI container 120 may include the task name as text summarization, input data as the input text, model predictions as the first summarized text, the desired output as the modified version of the summarized text that was further revised by the user, and a human preference score on a scale from 0 to 1 that indicates how different the summarized text is to the desired text for the user. The normalized feedback data may be stored in the inference datastore 280 in association with the data instances for the respective request such that the data can be used to further retrain the ML models of the AI container 120. The preference learner engine 365 generates a profile for a user that characterizes the preferences of the user for a particular task in a multidimensional space. For example, the profile for a summarization task may include a set of attributes, including preferences related to grammar, adequacy, hallucination, consistency, active or passive voice, certain expressions that the user tends to use in text. Specifically, the preference learner engine 365 may create one profile per user per inference task, as users may have different preferences across different types of inference tasks.

The customization engine 370 receives user profiles from the preference learner engine 365 and applies reinforcement learning (RL) to customize the one or more ML models of the AI container 120 according to the user preferences reflected in the profile. For example, the customization engine 370 may further update the ML models stored in the model datastore 285 to output predictions that align with user preferences related to grammar, consistency, active or passive voice, and the like for the summarization task that were learned by the preference learner engine 365. The RL algorithm takes as input collections of outputs from the ML models and their corresponding user feedback information. The RL algorithm uses a reward calculator function to determine the degree of deviation from the ideal user output. The RL algorithm then optimizes the model weights or parameters such that the ML model produces outputs that receive more positive feedback from the user. The RL algorithm may optimize the model weights so that it increases the cumulative rewards over time as determined by the reward calculator function for model inference outputs. For a set of ML model inputs, the total rewards at any given time $t_1$ should be greater than or equal to at $t_0$ where $t_1 > t_0$.

The performance evaluation engine 375 evaluates the learned preferences to determine whether the one or more ML models have come closer to generating predictions that reflect the desired preferences of the user. For example, the performance evaluation engine 375 may compare differences in predictions generated by a ML model and user preferences outlined in the user profile after the model has been customized by the customization engine 370 to determine whether the customization engine 370 is configuring the ML models to correctly reflect desired preferences of the user.

Returning to FIG. 2, the functionalities encompassed by the components of the AI container 120 can be continuously performed to automate the machine learning life cycle. For example, the components of the AI container 120 records and determines important data instances to store, performs automatic annotation of the data, incorporates user feedback to align the models with user-specific preferences, determines when model retraining should occur, how long the model should be trained for, which portions of the model should be updated, monitoring the updated model, and deploying the model within the AI container 120 for use by user applications 118.

In general, the set of components of the AI container 120 allow machine learning operations to be seamlessly performed on a client device 116 or the computing infrastructure 125 by using less data to improve the underlying models. For example, there may be no need to obtain explicit data annotations for the training data as data annotations are automatically performed by the AI container 120, saving significant amount of time and resources for human data annotation efforts. Moreover, the AI container 120 consistently monitor the resources of the client device 116 or the computing infrastructure 125 to optimize training processes for the models such that the training process is tailored to the resources and configurations of the client device 116. By packaging the AI container 120 as single executables, the AI system 110 allows many users of client devices 116 or computing infrastructure 125 to access many different types of AI applications that improve experience on user applications 118 or applications 119 without the need for the user to manage the machine learning life cycle themselves.

Method of Generating Executables

FIG. 4 is an example flowchart for generating self-contained AI executables according to one embodiment. The AI system 110 generates 410 an AI executable. In one embodiment, the AI executable when installed on a computing resource such as a client device 116 or computing infrastructure 125, is configured to generate a self-contained environment on the client device or infrastructure including a set of components. The set of components may include at least one or more ML models for performing a set of inference tasks. Specifically, the set of components, when installed on the client device, may be further configured to receive a request from a user application 118 on the client device 116 or an application 119 on the computing infrastructure 125 to perform one or more inference tasks. The set of components may also be configured to generate predictions using the one or more ML models and provide the predictions as a response to the request. The set of components may also be configured to perform machine learning operations for updating the one or more ML models using data generated from the client device 116 or the computing infrastructure 125. The AI system 110 may provide 412 the AI executable for download to one or more client devices.

Data Storage Method Using Data Similarity Engine

FIG. 5 is an example flowchart for a data similarity engine according to one embodiment. A data similarity engine receives 510 an incoming request to perform one or more inference tasks. The data similarity engine determines 512 similarity metrics between the input data of the request and existing instances of data stored in the inference datastore. In one embodiment, a similarity metric between input data for the request and a data instance in the inference datastore is determined by comparing the input data of the request to the input data recorded for the data instance.

Responsive to determining that one or more data instances have a similarity metric above a predetermined threshold, the data similarity engine determines 514 not to store the data for the incoming request as a new instance in the inference datastore. In one embodiment, the data similarity engine may retrieve the recorded predictions for the identified data instances and provide the recorded predictions to the model serving engine. Responsive to determining that no data instances have a similarity metric above a predetermined threshold, the data similarity engine determines 516 to store the data for the incoming request as a new instance in the inference datastore.

Method of Customizing ML Models Using Feedback Processor Engine

Figure 6:
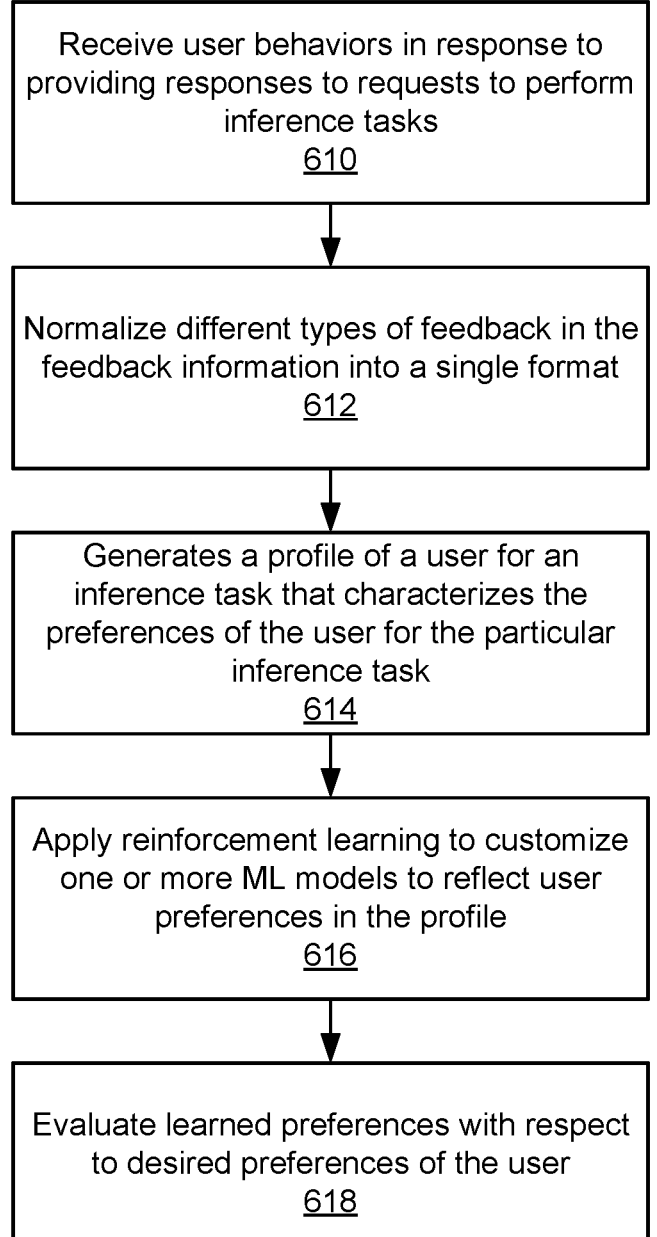
FIG. 6 is an example flowchart for a feedback processor engine according to one embodiment.

FIG. 6 is an example flowchart for a feedback processor engine according to one embodiment. A feedback processor engine receives 610 various user behaviors in response to providing responses to requests to perform one or more inference tasks. The feedback processor engine normalizes 612 different types of feedback that are included in the feedback information into a single format. In one embodiment, the feedback processor engine converts feedback information in the format of (task name, input data, model predictions, desired output for user, human preference score). The human preference score indicates a difference between the predictions generated by the ML model and the desired output for the user.

The feedback processor engine generates 614 a profile for a user that characterizes the preferences of the user for a particular task in a multi-dimensional space. The feedback processor engine applies 616 reinforcement learning (RL) techniques to customize the one or more ML models of the AI container according to the user preferences reflected in the profile. The feedback processor engine evaluates 618 the learned preferences to determine whether the one or more ML models have come closer to generating predictions that reflect the desired preferences of the user.

SUMMARY

The foregoing description of the embodiments of the disclosed configuration has been presented for the purpose of illustration; it is not intended to be exhaustive or to limit the disclosed configuration to the precise forms disclosed. Persons skilled in the relevant art can appreciate that many modifications and variations are possible in light of the above disclosure.

Some portions of this description describe the embodiments of the disclosed configuration in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed configuration may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosed configuration may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed configuration be limited not by this detailed description, but rather by any claims that issue on an application based hereon. Accordingly, the disclosure of the embodiments of the disclosed configuration is intended to be illustrative, but not limiting, of the scope of the disclosed configuration, which is set forth in the following claims.

What is claimed is:

1. A method, comprising:
   generating an artificial intelligence (AI) executable, the AI executable when installed on a computing resource configured to generate a self-contained environment on the computing resource including a set of components, the set of components including at least one or more machine-learning (ML) models for performing a set of inference tasks, the set of components, when installed on the computing resource, further performing:
   receiving a request from an application on the computing resource to perform one or more inference tasks,
   generating predictions using the one or more ML models and provide the predictions as a response to the request to the application,
   receiving feedback information from the application, the feedback information indicative of feedback from a user of the application on the generated predictions by a ML model for an inference task, and wherein the feedback information is generated by user interaction with the application,
   normalizing, for each of one or more feedback instances for the inference task, the feedback instance to indicate a difference between a generated prediction for the feedback instance and a desired prediction of the user,
   obtaining preferences of the user for the inference task, applying a reinforcement learning (RL) model to update parameters of the ML model to reflect the obtained preferences of the user,
   performing machine learning operations for updating the one or more ML models using at least data generated from the client device,
   storing, in data storage, information related to the request and the generated predictions for the request as a data instance,
   receiving a second request from the application to perform the one or more inference tasks,
   generating second predictions and provide the second predictions as a response to the second request to the application, and
   determining, responsive to determining that a similarity metric between the second request and the data instance is above a threshold, not to store data related to the second request in the data storage; and
   providing the AI executable for download to the computing resource.

2. The method of claim 1, wherein the computing resource is a client device including a laptop computer, a mobile device, a desktop computer, and wherein the application is installed on a local environment of the client device.

3. The method of claim 1, wherein the computing resource is a computing infrastructure including a public cloud infrastructure or an on-premise infrastructure, and wherein the application is deployed on the computing infrastructure.

4. The method of claim 1, wherein at least one ML model is configured to process data of two or more data modalities.

5. A non-transitory computer readable medium comprising stored instructions, the stored instructions when executed by at least one processor of one or more computing devices, cause the one or more computing devices to:

generate an artificial intelligence (AI) executable, the AI executable when installed on a computing resource configured to generate a self-contained environment on the computing resource including a set of components, the set of components including at least one or more machine-learning (ML) models for performing a set of inference tasks, the set of components, when installed on the computing resource, further configured to:

receive a request from an application on the computing resource to perform one or more inference tasks, generate predictions using the one or more ML models and provide the predictions as a response to the request to the application, receive feedback information from the application, the feedback formation indicative of feedback from a user of the application on the generated predictions by a ML model for an inference task, and wherein the feedback information is generated by user interaction with the application, for each of one or more feedback instances for the inference task, normalize the feedback instance to indicate a difference between a generated prediction for the feedback instance and a desired prediction of the user, obtain preferences of the user for the inference task, apply a reinforcement learning (RL) model to update parameters of the ML model to reflect the obtained preferences of the user, perform machine learning operations for updating the one or more ML models using at least data generated from the client device, store, in data storage, information related to the request and the generated predictions for the request as a data instance, receive a second request from the application to perform the one or more inference tasks, generate second predictions and provide the second predictions as a response to the second request to the application, and responsive to determining that a similarity metric between the second request and the data instance is above a threshold, determining not to store data related to the second request in the data storage; and provide the AI executable for download to the computing resource.

6. The non-transitory computer readable medium of claim 5, wherein the computing resource is a client device including a laptop computer, a mobile device, a desktop computer, and wherein the application is installed on a local environment of the client device.

7. The non-transitory computer readable medium of claim 5, wherein the computing resource is a computing infrastructure including a public cloud infrastructure or an on-premise infrastructure, and wherein the application is deployed on the computing infrastructure.

8. The non-transitory computer readable medium of claim 5, wherein at least one ML model is configured to process data of two or more data modalities.

9. A computer system comprising:
 one or more computer processors; and one or more computer readable mediums storing instructions that, when executed by the one or more computer processors, cause the computer system to:

generate an artificial intelligence (AI) executable, the AI executable when installed on a computing resource configured to generate a self-contained environment on the computing resource including a set of components, the set of components including at least one or more machine-learning (ML) models for performing a set of inference tasks, the set of components, when installed on the computing resource, further configured to:

receive a request from an application on the computing resource to perform one or more inference tasks, generate predictions using the one or more ML models and provide the predictions as a response to the request to the application, receive feedback information from the application, the feedback information indicative of feedback from a user of the application on the generated predictions by a ML model for an inference task, and wherein the feedback information is generated by user interaction with the application, for each of one or more feedback instances for the inference task, normalize the feedback instance to indicate a difference between a generated prediction for the feedback instance and a desired prediction of the user, obtain preferences of the user for the inference task, apply a reinforcement learning (RL) model to update parameters of the ML model to reflect the obtained preferences of the user, perform machine learning operations for updating the one or more ML models using at least data generated from the client device, store, in data storage, information related to the request and the generated predictions for the request as a data instance, receive a second request from the application to perform the one or more inference tasks, generate second predictions and provide the second predictions as a response to the second request to the application, and responsive to determining that a similarity metric between the second request and the data instance is above a threshold, determining not to store data related to the second request in the data storage; and provide the AI executable for download to the computing resource.

10. The computer system of claim 9, wherein the computing resource is a client device including a laptop computer, a mobile device, a desktop computer, and wherein the application is installed on a local environment of the client device.

11. The computer system of claim 9, wherein the computing resource is a computing infrastructure including a public cloud infrastructure or an on-premise infrastructure, and wherein the application is deployed on the computing infrastructure.

12. The computer system of claim 9, wherein at least one ML model is configured to process data of two or more data modalities.

\* \* \* \* \*